United States Patent
Pierco

(10) Patent No.: US 10,382,844 B2
(45) Date of Patent: Aug. 13, 2019

(54) OPTICAL SWITCHES AND METHODS OF REDUCING CROSS-TALK

(71) Applicant: Huber+Suhner Polatis Limited, Cambridge, Cambridgeshire (GB)

(72) Inventor: Ramses Pierco, Ghent (BE)

(73) Assignee: Huber+Suhner Polatis Limited, Cambridge (GB)

(*) Notice: Subject to any disclaimer, the term of this patent is extended or adjusted under 35 U.S.C. 154(b) by 172 days.

(21) Appl. No.: 15/518,220

(22) PCT Filed: Oct. 21, 2015

(86) PCT No.: PCT/GB2015/053146
§ 371 (c)(1),
(2) Date: Apr. 10, 2017

(87) PCT Pub. No.: WO2016/063054
PCT Pub. Date: Apr. 28, 2016

(65) Prior Publication Data
US 2017/0303017 A1 Oct. 19, 2017

(30) Foreign Application Priority Data
Oct. 21, 2014 (GB) .................................. 1418719.9

(51) Int. Cl.
*H04Q 11/00* (2006.01)
*H04J 3/10* (2006.01)
(Continued)

(52) U.S. Cl.
CPC .......... *H04Q 11/0005* (2013.01); *H04B 3/32* (2013.01); *H04J 1/12* (2013.01); *H04J 3/10* (2013.01);
(Continued)

(58) Field of Classification Search
CPC ....... H04Q 11/0005; H04Q 2011/0039; H04Q 2011/0049; H04Q 2201/14; H04J 1/12;
(Continued)

(56) References Cited

U.S. PATENT DOCUMENTS 4,652,087 A * 3/1987 Bos .................. G02F 1/133533
349/167
6,075,910 A 6/2000 Page et al.
(Continued)

FOREIGN PATENT DOCUMENTS

| EP | 1 239 695 A1 | 9/2002 |
|---|---|---|
| EP | 1 239 695 A2 | 9/2002 |
| GB | 2494116 A | 3/2013 |

OTHER PUBLICATIONS

International Search Report and Written Opinion dated Jan. 21, 2006, issued in PCT Application No. PCT/GB2015/053146, filed Oct. 21, 2015.
(Continued)

*Primary Examiner* — Li Liu
(74) *Attorney, Agent, or Firm* — Workman Nydegger

(57) ABSTRACT

An optical switch with a plurality of actuators includes a controller configured to control the operation of a plurality of channels, where each channel has at least one electrical driver and at least one actuator, by interleaving periods of voltage switching output with periods of no voltage switching output for one or more drivers whilst the output voltage is switching from one level to another level. Alternatively, an optical switch with a plurality of actuators comprises a controller configured to control the operation of a plurality of channels, where each channel has at least one electrical driver and at least one actuator, by switching the output voltage from one level to another level for at least one driver of a first channel whilst at least one oilier driver of at least one other channel is in a relatively high impedance mode.

20 Claims, 3 Drawing Sheets

(51) Int. Cl.
   *H04J 11/00* (2006.01)
   *H04J 1/12* (2006.01)
   *H04B 3/32* (2006.01)

(52) U.S. Cl.
   CPC .... *H04J 11/0023* (2013.01); *H04B 2215/069* (2013.01); *H04Q 2011/0039* (2013.01); *H04Q 2011/0049* (2013.01); *H04Q 2201/14* (2013.01)

(58) Field of Classification Search
   CPC ... H04J 3/10; H04J 11/0023; H04B 2215/069; H04B 3/32
   USPC ............. 398/25, 39, 45, 158, 159, 194
   See application file for complete search history.

(56) References Cited

U.S. PATENT DOCUMENTS

| | | | |
|---|---|---|---|
| 7,026,745 B2 * | 4/2006 | Dames | G02B 6/32 310/328 |
| 7,095,915 B2 | 8/2006 | Dames | |
| 7,106,925 B2 | 9/2006 | Dames | |
| 7,231,126 B2 | 6/2007 | Dames | |
| 7,389,016 B2 | 6/2008 | Dames | |
| 7,522,789 B2 * | 4/2009 | Dames | G02B 6/2931 385/15 |
| 7,876,981 B2 | 1/2011 | Dames | |
| 8,358,929 B2 | 1/2013 | Lewis et al. | |
| 2002/0122617 A1 * | 9/2002 | Nakajima | H04Q 11/0005 385/16 |
| 2004/0169545 A1 | 9/2004 | Aiba et al. | |
| 2010/0007704 A1 | 1/2010 | Nitta | |
| 2011/0127880 A1 | 6/2011 | Murphy et al. | |
| 2012/0147075 A1 | 6/2012 | Hiyoshi et al. | |
| 2012/0176430 A1 | 7/2012 | Nitta et al. | |
| 2014/0240383 A1 * | 8/2014 | Penberth | H01L 41/042 347/10 |

OTHER PUBLICATIONS

Ramses Pierco et al., *A 16 Channel High-Voltage Driver with 14 Bit Resolution for Driving Piezoelectric Actuators,* IEEE Transactions on Circuits and System, vol. 62, No. 7, Jul. 2015, pp. 1726-1736.

* cited by examiner

US 10,382,844 B2

OPTICAL SWITCHES AND METHODS OF REDUCING CROSS-TALK

FIELD OF THE INVENTION

The invention relates to optical switches and methods of reducing cross-talk.

The invention also relates to electrical drivers for capacitive loads (in a preferred embodiment the whole of driver circuit and capacitive load is referred to as a "channel") and more in particular to techniques to reduce the dynamic electrical cross-talk voltages at a certain channel(s) caused by switching the voltage at another channel(s).

BACKGROUND TO THE INVENTION AND PRIOR ART KNOWN TO THE APPLICANT

Piezoelectric actuators are used in a large variety of fields where accurate positioning is required. The applicant's own prior patent publications provide examples of prior art configurations. In particular, the following prior art documents are acknowledged and enclosed by reference: U.S. Pat. Nos. 7,026,745, 7,095,915, 7,106,925, 7,231,126, 7,389,016, 7,876,981, 7,522,789, and 8,358,929.

From an electrical viewpoint the actuators of the kind employed in these prior art switches are mainly a capacitive load and are controlled by applying a voltage signal to the actuator by means of a driver circuit. Several applications, in particular in the field of optical switches require large arrays of piezoelectric actuators of which the controlling voltage signal needs to be switched within a certain time frame.

When several driver circuits have the same electrical supply, by sharing either or both the ground and positive supply line, the electrical cross-talk between driver voltages can become a significant issue. Especially the dynamic electrical cross-talk voltage, generated by switching the voltage signal at a certain driver, is problematic since compensation by means of a position feedback loop is very difficult to achieve (in the case of piezoelectric actuators) due primarily to limitations on the position feedback loop bandwidth. This issue becomes even more pronounced when integrating several drivers onto a single chip due to the nature of on-chip ground and supply lines which typically have a larger impedance than traces on a printed circuit board (PCB).

The cause of the cross-talk is the impedance of the supply/ground feed lines or in some cases the output impedance of the voltage supply used to power the driver circuit. In order to reduce the dynamic electrical cross-talk between channel voltages a simple method might be to lower the impedance of the supply feeds and to lower the output impedance of the voltage supply or/and add more decoupling to the voltage supply. However close placement of drivers on a PCB or integration of several drivers onto a chip results in a lower limit to the impedance that can be achieved.

The above mentioned issue of inter-driver cross-talk leads to a need for a system-level solution(s) to reduce the electrical cross-talk between channels.

SUMMARY OF THE INVENTION

Alternative solutions to reducing cross-talk are presented as first and second broad independent aspects.

In a first broad independent aspect, the invention provides an optical switch with a plurality of actuators comprising a controller configured to control the operation of a plurality of channels, where each channel has at least one electrical driver and at least one actuator, by interleaving periods of voltage switching output with periods of no voltage switching output for one or more drivers whilst the output voltage is switching from one level to another level.

This configuration is particularly advantageous since it allows the average cross-talk in neighbouring channels to be significantly lowered.

In a second broad independent aspect, the invention provides an optical switch with a plurality of actuators comprising a controller configured to control the operation of a plurality of channels, where each channel has at least one electrical driver and at least one actuator, by switching the output voltage from one level to another level for at least one driver of a first channel whilst at least one other driver of at least one other channel is in a relatively high impedance mode.

This configuration is particularly advantageous because it isolates the voltage of other channels from cross-talk caused by the first channel which may also be referred to as the aggressor. This configuration substantially reduces cross-talk.

In a subsidiary aspect, said switch comprises a plurality of other drivers which are in a relatively high impedance mode by sampling previous output values onto the channel capacitance. This configuration is particularly advantageous due to its effect on the profile of potential cross-talk.

In a subsidiary aspect, one or more non-switching drivers are in a relatively high impedance mode during switching of a driver.

In a subsidiary aspect, one or more voltages of one or more non-switching drivers are re-sampled during switching of a driver.

In a subsidiary aspect, the periods of switching are longer than the periods of re-sampling. This configuration offers an efficient advance in reducing the cross-talk without significantly increasing the switching time.

In a subsidiary aspect, several discrete driver circuits are integrated into a single chip.

In a subsidiary aspect, said actuators are piezo-electric actuators. Preferably, the piezo-electric actuators are elongate beams with a laminate construction. The beams are preferably supported at one end of the beam and are adapted to bend to displace the end of the beam in at least 2 dimensions. The displacement of the end of the beam drives the orientation of an optical element which may be a collimator.

In a further broad independent aspect, the invention provides a method of reducing cross-talk in an optical switch with a plurality of channels, where each channel has at least one electrical driver and at least one actuator, the method comprising the steps of interleaving periods of voltage switching output with periods of no voltage switching output for one or more drivers whilst the output voltage is switching from one level to another level.

In a further broad independent aspect, the invention provides a method of reducing cross-talk in an optical switch with a plurality of channels, where each channel has at least one electrical driver and at least one actuator, the method comprising the steps of switching the output voltage from one level to another level for at least one driver of a first channel whilst at least one other driver of another channel is in a relatively high impedance mode.

In a subsidiary aspect, said other drivers are in a relatively high impedance mode by sampling previous output values onto the channel capacitance.

In a subsidiary aspect, one or more non-switching drivers are in a relatively high impedance mode during switching of a driver.

In a subsidiary aspect, one or more voltages of one or more non-switching drivers are re-sampled during switching of a driver.

In a subsidiary aspect, the periods of switching are longer than the periods of re-sampling.

In a subsidiary aspect, several discrete driver circuits are integrated into a single chip.

In a further independent aspect, the invention provides a method of controlling the operation of a plurality of channels, where each channel has at least one electrical driver and at least one actuator, the method comprising the steps of interleaving periods of voltage switching output with periods of no voltage switching output for one or more drivers whilst the output voltage is switching from one level to another level.

In a further independent aspect, the invention provides a method of controlling the operation of a plurality of channels, where each channel has at least one electrical driver and at least one actuator, the method comprising the steps of switching the output voltage from one level to another level for at least one driver whilst other drivers are in a relatively high impedance mode.

In a further independent aspect, the invention provides an optical switch with a plurality of actuators comprising a controller configured to control the operation of a plurality of channels, where each channel has at least one electrical driver and at least one actuator, by interleaving periods of voltage switching output with periods of no voltage switching output for one or more drivers whilst the output voltage is switching from one level to another level.

In a further independent aspect, the invention provides an optical switch with a plurality of actuators comprising a controller configured to control the operation of a plurality of channels, where each channel has at least one electrical driver and at least one actuator, by switching the output voltage from one level to another level for at least one driver whilst other drivers are in a relatively high impedance mode.

DETAILED DESCRIPTION OF THE FIGURES

Certain embodiments of the invention relate to a technique of reducing the electrical cross-talk between drivers for capacitive loads (driver circuit together with capacitive load is referred to as a "channel"). More in particular the technique aims, in certain embodiments, at reducing the dynamic cross-talk on one/several driver(s) signal(s) generated by a voltage switching event on another driver(s). An embodiment of this technique comprises the following parts:

(a) A switch of the output voltage, from one voltage level to the next voltage level, of a certain driver(s) is split up into several short time periods in which the voltage output switches a part of the complete voltage interleaved with periods in which no voltage switching occurs. This type of switching is referred to as "staggered switching" and is able to lower the average dynamic electrical cross-talk.

(b) In the periods that the output voltage of a certain output driver(s) (the aggressor(s)) is switched, the output of the affected other drivers is put into high-impedance mode, effectively sampling the previous value of these other drivers onto the channel capacitance. Thus isolating the voltage of other channels from cross-talk caused by the aggressor(s).

(c) The cross-talk reduction methods mentioned in (a) and (b) can be combined into a staggered switching mode in which the non-switching drivers are put into high-impedance mode (the output is isolated from ground/supply by means of a high impedance) during switching of the voltage of a certain driver(s). In the interleaved period without switching, all drivers are put out of high-impedance mode which comes down to a re-sampling of the non-switching driver(s) voltage(s).

(d) The method described in (c) can be performed with either equally long periods of switching and re-sampling or with a difference between the time taken for the switching and re-sampling. By using a re-sampling time that is significantly shorter than the switching time, the overall switching time increases marginally in respect to a switch without any of the previously described cross-talk reduction techniques.

When multiple driver circuits, used to impose a certain voltage on a capacitive load, use the same electrical ground or supply line, dynamic cross-talk voltages can occur at a certain channel (combination of driver circuit and capacitive load) when other channels have their voltage being switched. This is caused by the non-zero impedance of the supply/ground lines which results in an error voltage when current is being sourced from the supply line or sunk into the ground line when a driver switches its output voltage. When integrating several drivers onto one chip the amount of cross-talk can become large in respect to the cross-talk of discrete driver circuits due to the typically large impedance of supply/ground lines on a chip compared to lines on a printed circuit board.

Figure 1:
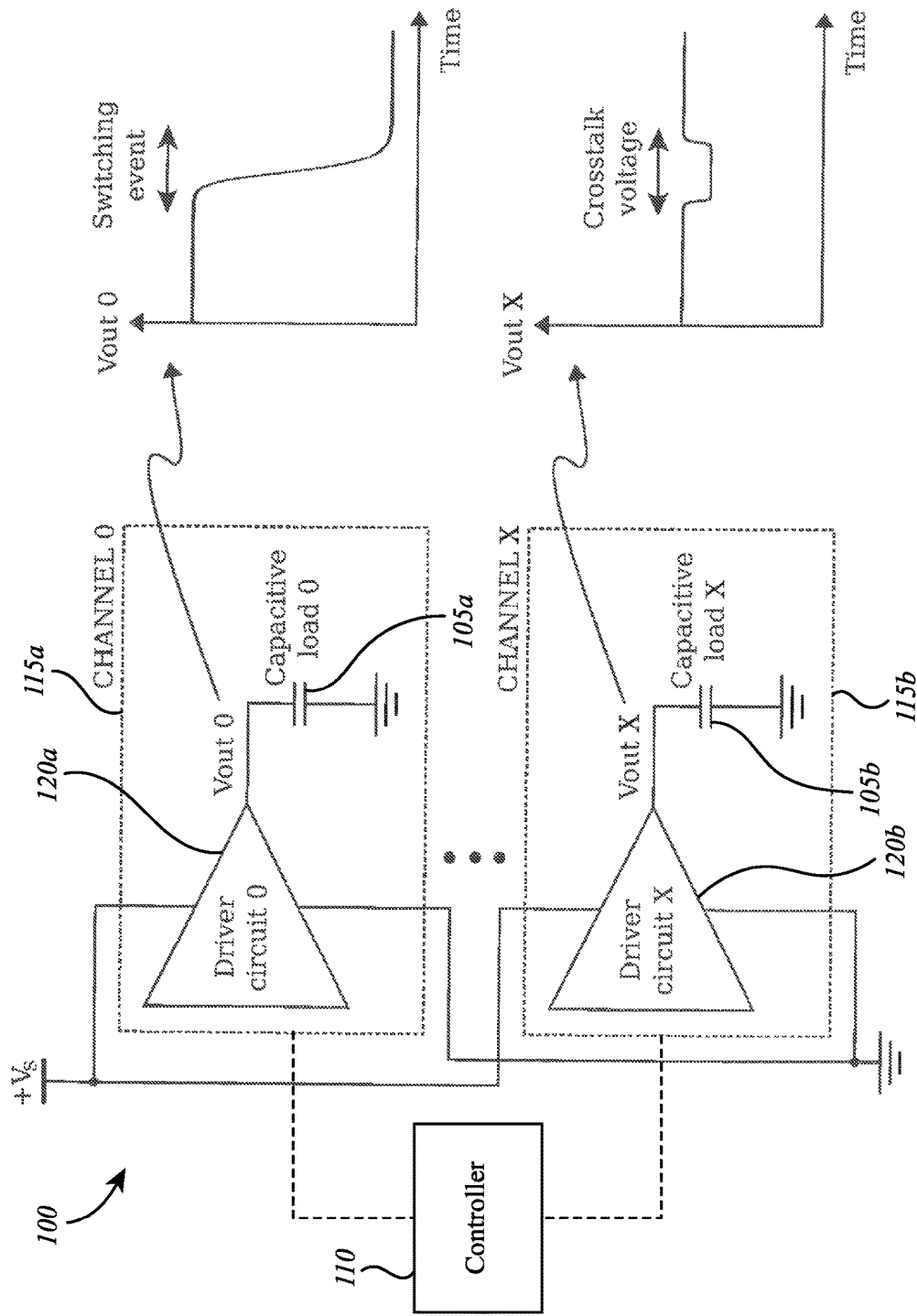
FIG. 1 shows a setup with several channels sharing the same supply Vs+ and ground together with typical voltages associated with a switching event occurring at channel 0.

FIG. 1 shows a setup with several channels sharing the same supply Vs+ and ground. A switching event at one channel (in this case channel 0) will cause a cross-talk voltage at the channels sharing the same supply and ground lines. Typical switching and cross-talk voltage waveforms are shown to the right.

More specifically, FIG. 1 shows an optical switch 100 with a plurality of actuators 105a, 105b comprising a controller 110 configured to control the operation of a plurality of channels 115a, 115b, where each channel 115a, 115b has at least one electrical driver 120a, 120b and at least one actuator 105a, 105b, by interleaving periods of voltage switching output with periods of no voltage switching output for at least one driver whilst the output voltage is switching from one level to another level.

A system-level solution(s) is proposed to lower the cross-talk voltages induced by a switching driver onto a non-switching driver voltage. One solution consists of splitting the switching time into smaller time periods in which switching periods are interleaved with non-switching periods referred to as staggered switching. This allows the lowering of the average cross-talk voltage at the non-switching channels.

A second solution is to put the non-switching drivers into high-impedance mode during the time in which switching of another driver (the aggressor) occurs. This effectively samples the correct voltage onto the load capacitance of the channel which isolates the channel from cross-talk voltages. Due to leakage currents at both the driver and possibly the load (caused by a parasitic parallel resistor), the voltage at the channel will drop in time. This drop in channel voltage increases with the switching time of the aggressor and can become too large for certain cases. This is solved by using a third solution.

The third solution proposed, combines solution one and two which means that during the non-switching periods of the first solution the other non-switching channels are placed into high-impedance mode. By choosing an appropriate time for the switching periods, the drop in channel voltage can be limited. The result of using solution one and three compared to a regular switch is shown in FIG. 2.

Figure 2:
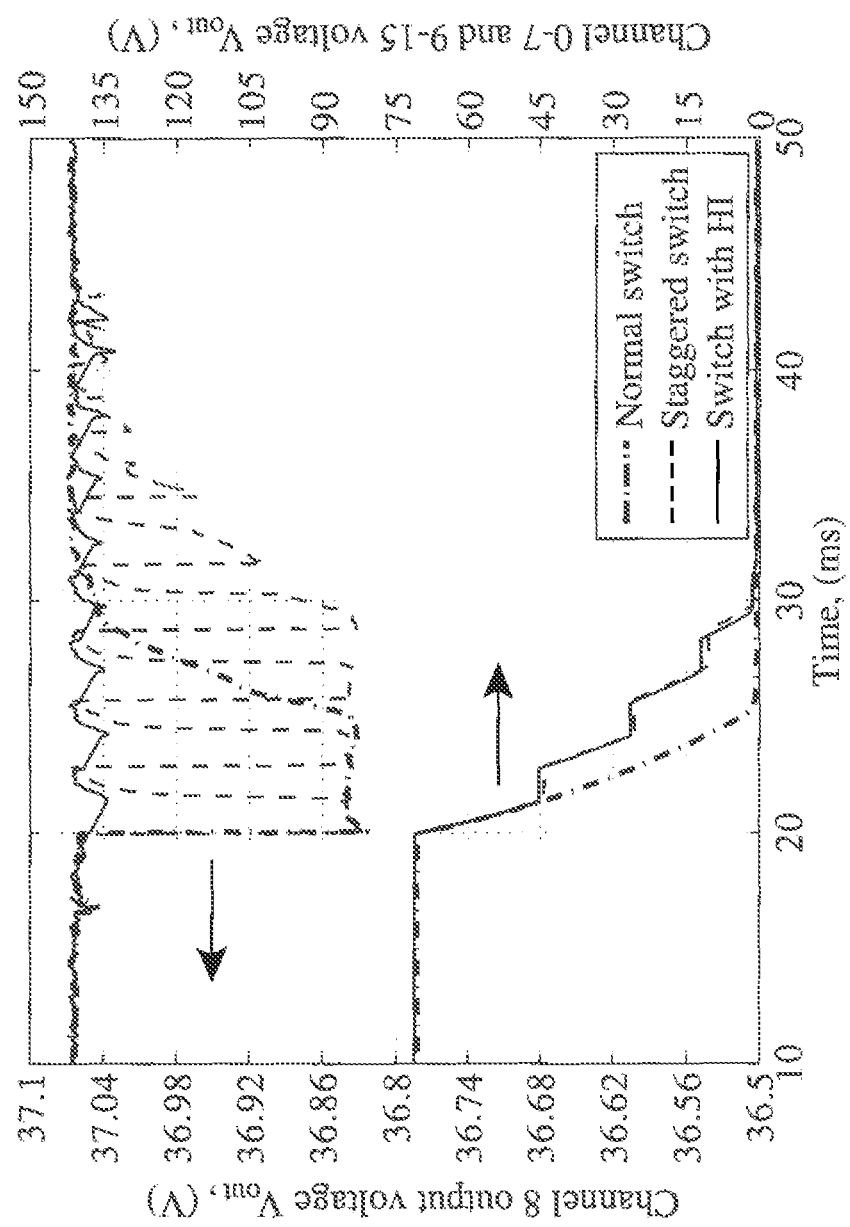
FIG. 2 shows the measured cross-talk voltage at a single channel with 15 "nearby" channel voltages switching. The switching characteristic and the resulting cross-talk is shown for a normal switch, a staggered switch and a staggered switching with high-impedance (HI) mode during the non-switching time periods.

FIG. 2 shows measured cross-talk (left y-axis) and switching voltages (right y-axis) in function of time (x-axis) for a chip with 16 integrated channel drivers of which the voltages of channels 0-7 and channels 9-15 are being switched from the supply voltage down to the ground rail while the voltage at channel 8 is being kept approximately halfway. Three different methods of switching are used, being: normal switching, staggered switching and staggered switching in which the non-switching driver (channel 8) is put into high-impedance (HI) mode during the switching of the other channels. Switching and non-switching time periods are equal in this measurement. The normal switching has the shortest switching time but also the highest average cross-talk while the average cross-talk in case of staggered switching with HI-mode is low in comparison.

In FIG. 2, a drop of the voltage at the non-switching channel can be observed for the staggered switch with HI-mode. This drop occurs during the switching of the other channels and is caused by the finite resistance at the output of the driver circuit of the non-switching channel. The drop in channel voltage Vd can then be expressed as:

$$Vd = Vs \cdot \left(1 - e^{\frac{-t}{RC}}\right)$$

With Vs the voltage sampled at the channel, t the time during which the non-switching channel is put into high-impedance mode, R the resistivity measured at the channel and C the capacitance of the load. By choosing a short switching time the drop in voltage can be limited however the switching time will double if the time taken for the switching and non-switching period is equal.

A fourth solution is to use the third solution with unequal switching and non-switching times which allows to limit the increase in switching time in comparison to normal switching. This reduction is achieved by making the non-switching (re-sampling) time significantly smaller than the switching time which is shown in FIG. 3.

Figure 3:
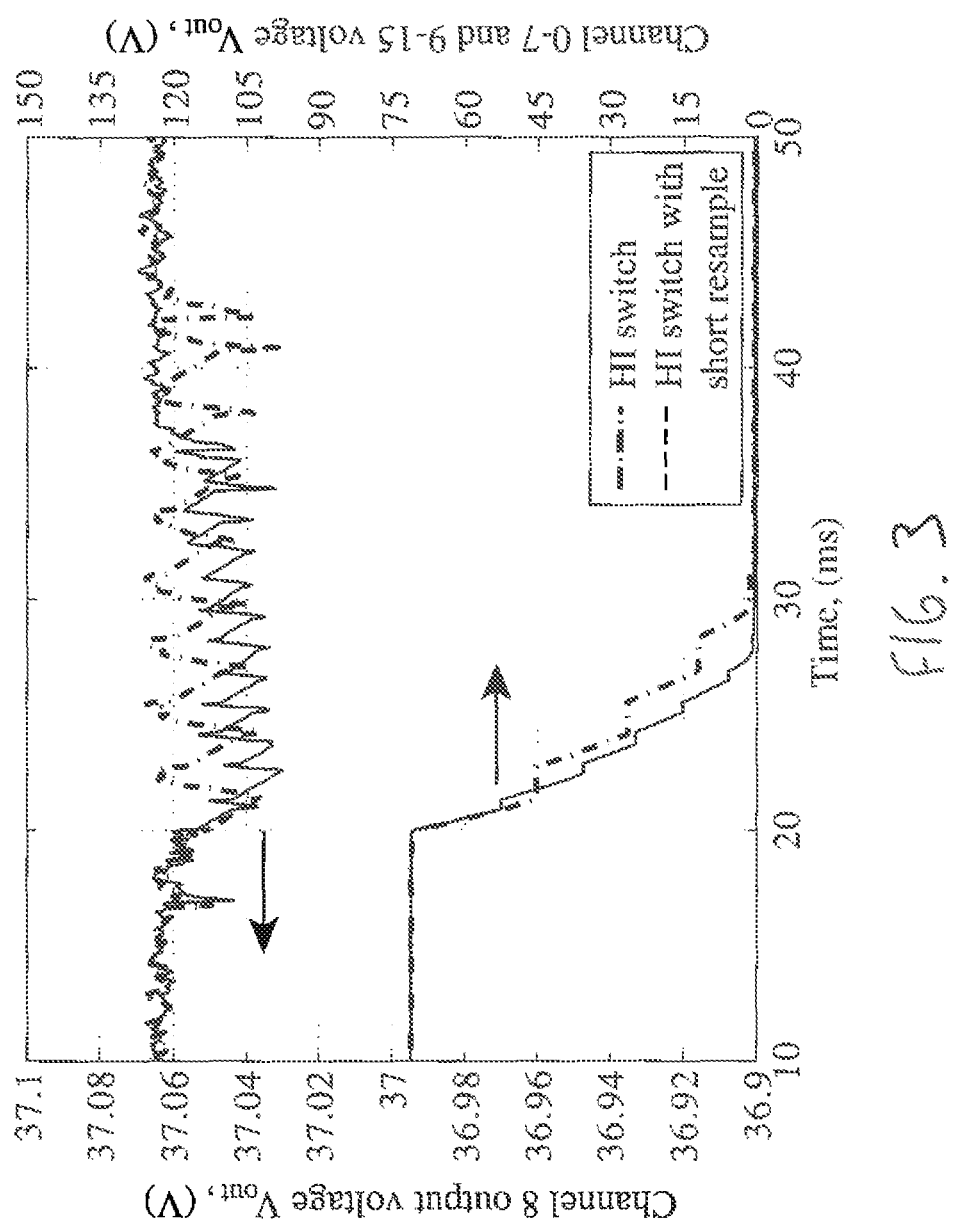
FIG. 3 shows the measured cross-talk voltage at a single channel while 15 "nearby" channel voltages switch using staggered switching with HI-mode. The result in case of equal switching and non-switching periods is shown together with the result of using a shorter non-switching (re-sampling) period.

FIG. 3 shows measured cross-talk (left y-axis) and switching voltages (right y-axis) in function of time (x-axis) for a chip with 16 integrated channel drivers of which the voltages of channels 0-7 and channels 9-1 are being switched from the supply voltage down to the ground rail while the voltage at channel 8 is being kept approximately halfway. Staggered switching with HI-mode is used for the two measurements with one measurement showing the result of using equal switching and non-switching time periods and the other depicting the result in case of a shorter non-switching (re-sampling) time period. Both cases show similar cross-talk voltages, however, the use of a shorter non-switching time period can lead to significant shorter switch times (roughly 8 ms instead of 12 ms).

The invention claimed is:

1. An optical switch with a plurality of actuators comprising a controller configured to control the operation of a plurality of channels, where each channel has at least one electrical driver and at least one actuator, by interleaving periods of voltage switching output with periods of no voltage switching output for at least one drivers whilst the output voltage is switching from one level to another level.

2. The optical switch according to claim 1, wherein at least one non-switching driver is in a relatively high impedance mode during switching of a driver.

3. The optical switch according to claim 2, wherein at least one voltage of at least one non-switching driver is re-sampled during switching of a driver.

4. The optical switch according to claim 3, wherein the periods of switching are longer than the periods of re-sampling.

5. The optical switch according to claim 1, wherein several discrete driver circuits are integrated into a single chip.

6. The optical switch according to claim 1, wherein said actuators are piezo-electric actuators.

7. An optical switch with a plurality of actuators comprising a controller configured to control the operation of a plurality of channels, where each channel has at least one electrical driver and at least one actuator, by switching the output voltage from one level to another level for at least one driver of a first channel whilst at least one other driver of at least one other channel is in a relatively high impedance mode.

8. The optical switch according to claim 7, wherein said switch comprises a plurality of other drivers which are in a relatively high impedance mode by sampling previous output values onto the channel capacitance.

9. The optical switch according to claim 7, wherein several discrete driver circuits are integrated into a single chip.

10. The optical switch according to claim 7, wherein said actuators are piezo-electric actuators.

11. A method of reducing cross-talk in an optical switch with a plurality of channels, where each channel has at least one electrical driver and at least one actuator, the method comprising the steps of interleaving periods of voltage switching output with periods of no voltage switching output for one or more drivers whilst the output voltage is switching from one level to another level.

12. The method according to claim 11, wherein at least one non-switching driver is in a relatively high impedance mode during switching of a driver.

13. The method according to claim 12, wherein at least one voltage of at least one non-switching driver is re-sampled during switching of a driver.

14. The method according to claim 13, wherein the periods of switching are longer than the periods of re-sampling.

15. The method according to claim 11, wherein several discrete driver circuits are integrated into a single chip.

16. The method according to claim 11, wherein each channel has at least one dedicated electrical driver.

17. A method of reducing cross-talk in an optical switch with a plurality of channels, where each channel has at least one electrical driver and at least one actuator, the method comprising the steps of switching the output voltage from one level to another level for at least one driver of a first channel whilst at least one other driver of another channel is in a relatively high impedance mode.

18. The method according to claim 17, wherein said other drivers are in a relatively high impedance mode by sampling previous output values onto the channel capacitance.

19. The method according to claim 17, wherein several discrete driver circuits are integrated into a single chip.

20. The method according to claim 17, wherein each channel has at least one dedicated electrical driver.

* * * * *